(12) United States Patent
Accarie (10) Patent No.: US 6,502,144 B1
(45) Date of Patent: Dec. 31, 2002

(54) DATA PROCESSING APPARATUS WITH COMMUNICATION FEATURE, AND COMMUNICATION METHOD IN A DATA PROCESSING APPARATUS

(75) Inventor: Jean-Paul Accarie, Vern sur Seiche (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/232,214

(22) Filed: Jan. 19, 1999

(30) Foreign Application Priority Data

Jan. 19, 1998 (FR) .............................. 98 00507

(51) Int. Cl.⁷ ...................... G06F 13/10; G06F 13/14
(52) U.S. Cl. ................... 710/8; 710/11; 709/213; 709/225; 709/301
(58) Field of Search ................ 710/8, 11; 709/213, 709/223, 225, 301

(56) References Cited

U.S. PATENT DOCUMENTS

| | | | | |
|---|---|---|---|---|
| 5,172,245 A | * | 12/1992 | Kita et al. ................... | 358/403 |
| 5,548,731 A | * | 8/1996 | Chang et al. ................ | 395/280 |
| 5,581,709 A | | 12/1996 | Ito et al. ................. | 395/200.15 |
| 5,625,795 A | * | 4/1997 | Sakakura et al. ............ | 395/475 |
| 5,638,517 A | * | 6/1997 | Bartek et al. .......... | 395/200.18 |
| 5,671,355 A | | 9/1997 | Collins .................... | 395/200.2 |
| 5,819,112 A | * | 10/1998 | Kusters ....................... | 395/856 |

FOREIGN PATENT DOCUMENTS

| | | |
|---|---|---|
| EP | 767564 A2 | 4/1997 |
| GB | 2306850 A | 5/1997 |

* cited by examiner

*Primary Examiner*—Thomas Lee
*Assistant Examiner*—Rehana Perveen
(74) *Attorney, Agent, or Firm*—Fitzpatrick, Cella, Harper & Scinto (57) ABSTRACT

The communication method concerns two data processing apparatuss (101, 105) each having a microprocessor (201, 211) and memory (205, 215), a first one (105) at least of the data processing apparatus having and managing at least one input/output resource (106).

For communicating each set of user information coming from the second data processing apparatus and intended to be transmitted to an input/output resource managed by the first of the data processing apparatuses, it includes:

performed by the second data processing apparatus, a step of dissociating, with the said set of user information, a set of additional information representing:

the communication protocol from which the information comes in the second data processing apparatus, and         the said input/output resource; and     performed conjointly by the two data processing apparatuses, a step of transmitting the said sets of information from the second data processing apparatus to the first data processing apparatus.

27 Claims, 8 Drawing Sheets

DATA PROCESSING APPARATUS WITH COMMUNICATION FEATURE, AND COMMUNICATION METHOD IN A DATA PROCESSING APPARATUS

DESCRIPTION OF RELATED ART

The present invention concerns a communication method, a sending method, a receiving method and apparatuses implementing them.

The field of communication over a network between data processing apparatuses concerns in particular communication over a network from a computer, for example, known as a "PC" (initials of the English words "Personal Computer"), provided with a network communication interface, known as an "NIC" (initials of the English words "Network Interface Card").

It should be stated here that an input/output resource, such as for example a network resource, generally consists of a network communication interface, software for controlling this interface and a control and signalling software module which controls the operation of the control software and which organises the signalling of the transmission channel followed by the transmitted data.

The invention is concerned with the case where at least two data processing apparatuses communicate with each other, the data processing apparatuses here considered to be all the data processing apparatuses capable of implementing a communication.

When two data processing apparatuses communicate with each other, and must have access to a network, each of them must have its network access card. This solution has the drawback of imposing a complexity of hardware and software architecture, and therefore also a high total cost of the data processing apparatuses.

The document U.S. Pat. No. 5,581,709 (Mitsubishi Denki Kabushiki Kaisha) describes an apparatus enabling the central unit of a host system to access an input/output card situated in another system, as if the input/output card were connected directly to the bus of the host system. For this purpose, the central unit has, on the host bus, a physical address and a command operating on the bus. The input/output resources are thus shared at the physical level, insofar as the bus on which the input/output card is situated is allocated to a host system throughout the transaction, the host system having its own bus in the wait state throughout this period. Thus the same input/output card cannot be used by two different host systems simultaneously. Moreover, the apparatus according to the invention merely manages the elementary reading and writing transactions in the resource without managing the communication channel (or "path").

SUMMARY OF THE INVENTION

The present invention sets out to remedy these drawbacks. To this end, according to a first aspect, the present invention relates to a communication method in a second data processing apparatus having a microprocessor and memory, said method including the steps of:
  sharing a network interface driver managed by a first data processing apparatus; and
  transmitting primary information to the network interface driver which accesses to a network.

According to particular characteristics of the first aspect of the present invention, the communication method further includes:

performed by the second data processing apparatus, a step of associating, with the said primary information, additional information representing:
  the communication protocol from where the primary information comes in the second data processing apparatus, and
  input/output resource; and
performed conjointly by the two data processing apparatuses, a step of transmitting the said primary information and the said additional information from the second data processing apparatus to the first data processing apparatus.

According to a second aspect, the present invention relates to a communication method in a first data processing apparatus having a microprocessor and memory, said method including the steps of:
  executing a network interface driver managed by the data processing apparatus; and
  transmitting primary information coming from the network interface driver which accesses to a network to a second data processing apparatus.

According to particular characteristics of this second aspect of the present invention, the communication method further includes:

performed by the first data processing apparatus, a step of associating, with the said primary information, additional information representing:
  the communication protocol for which the primary information is intended in the first data processing apparatus, and
  input/output resource; and
performed conjointly by the two data processing apparatuses, a step of transmitting the said primary information and the said additional information from the first data processing apparatus to the second data processing apparatus.

By virtue of each of these provisions, the additional information enables the second data processing apparatus, which does not have the input/output resource in question:
  to use the input/output resource (for example the access to the network) incorporated in the first data processing apparatus,
  in order to transmit the user data by implementing the communications protocol under consideration, and
  to continue a communication session which has already been opened and to transfer the user information directly by means of the said input/output resource.

The present invention therefore makes it possible to share the input/output resource between the two data processing apparatuses, although this resource is physically linked only to one of the communication apparatuses.

Finally, the duration of communication is generally reduced, since the network communication interface, for example, minimises the number of data copies.

According to particular characteristics of the first aspect of the present invention, after the operation of transmitting the sets of information, the first data processing apparatus performs an operation of dissociating the set of additional information on the one hand and the set of user information on the other hand.

By virtue of these provisions, the additional information is not transmitted to the input/output resource, and therefore, for this resource, just as for the network and the recipient of the set of user information, the latter is presented in the same way, whether it comes from the first data processing apparatus or from the second data processing apparatus.

Correlatively, according to particular characteristics of the second aspect of the present invention, after the operation of transmitting the sets of information, the second data processing apparatus performs an operation of dissociating the set of additional information on the one hand and the set of user information on the other hand.

By virtue of these provisions, the application or the protocol for which the set of user information is intended receives in the same way the sets of user information which come from, or are intended for, the second data processing apparatus for those which come from, or are intended for, the input/output resource managed by the first data processing apparatus.

According to particular characteristics of the first aspect of the present invention, during the operation of transmitting the said sets of information, the method includes:
 performed by the second data processing apparatus, a step of storing in an intermediate storage means, and
 performed by the first data processing apparatus, a step of reading from the said intermediate storage means.

Correlatively, according to particular characteristics of the second aspect of the present invention, during the operation of transmitting the sets of information, the method includes:
 performed by the first data processing apparatus, a step of storing in an intermediate storage means, and
 performed by the second data processing apparatus, in step of reading from the said intermediate storage means.

By virtue of each of these provisions, the storage means is accessed, independently, in write and read mode, by each of the data processing apparatuses, without it being necessary for these data processing apparatuses to operate either synchronously or even at the same frequency, without it being necessary for the addresses used for accessing the storage means necessarily to be identical, and without a conjoint initialisation of the different data processing apparatuses being necessary.

The architectures of the data processing apparatuses can therefore be designed independently and operate independently, for example using different operating systems, outside the phases of communication between these data processing apparatuses.

This therefore makes it possible, in particular, to choose a apparatus architecture and an operating system which is best adapted to the management of the input/output card.

According to particular characteristics of each aspect of the present invention, during the operation of associating with the said set of user information, the set of additional information also represents the type of user information, this type being able to correspond on the one hand to signalling and/or control information, intended to be interpreted for using the input/output resource or on the other hand to information to be transmitted at a distance.

By virtue of these provisions, the first data processing apparatus can easily identify whether the set of user information is intended for the driver of the input/output resource or for the signalling and/or control module of this driver.

According to particular characteristics of each aspect of the present invention, during the operation of association with the said set of user information, the set of additional information also represents the data processing apparatus from where the said set of user information comes.

According to particular characteristics of each aspect of the present invention, during the operation of association with the said set of user information, the set of additional information also represents the data processing apparatus for which the said set of user information is intended.

By virtue of each of these provisions, in the case where several data processing apparatuses can have data to transmit or to receive by means of the input/output resource managed by the first data processing apparatus, the first data processing apparatus can easily identify the data processing apparatus which is communicating.

According to a third aspect, the present invention relates to a second data processing apparatus including:
 means for sharing a network interface driver managed by a first data processing apparatus; and
 means for transmitting primary information to the network interface driver in order to communicate with other data processing apparatus via a network.

According to a fourth aspect, the present invention relates to a first data processing apparatus including:
 means for executing a network interface driver managed by the data processing apparatus; and
 means for transmitting primary information coming from the network interface driver to a second data processing apparatus.

The invention also relates to a storage means for storing instructions which, when executed by a microprocessor of a second data processing apparatus, cause the second data processing apparatus to perform the steps of:
 sharing a network interface driver managed by a first data processing apparatus; and
 transmitting primary information to the network interface driver which accesses to a network.

The invention also relates to a storage means for storing instructions which, when executed by a microprocessor of a first data processing apparatus, cause the first processing apparatus to perform the steps of:
 executing a network interface driver managed by the data processing apparatus; and
 transmitting primary information coming from the network interface driver which accesses to a network to a second data processing apparatus.

The invention also relates to:
 a computer, characterised in that it has an apparatus as briefly disclosed above,
 a network, characterised in that it includes an apparatus as briefly disclosed above, each input/output resource being connected to the said transmission channel,
 a printer, characterised in that it includes an apparatus as briefly disclosed above,
 a scanner, characterised in that it includes an apparatus as briefly disclosed above,
 a facsimile machine, characterised in that it includes an apparatus as briefly disclosed above,
 a photocopier, characterised in that it includes an apparatus as briefly disclosed above,
 a camera, characterised in that it includes an apparatus as briefly disclosed above, and
 a photographic apparatus, characterised in that it includes an apparatus as briefly disclosed above, The apparatuses according to the third and fourth aspect of the present invention, these storage means, as well as this computer, this network, this printer, this scanner, this facsimile machine, this photocopier, this camera and this photographic apparatus, have the same particular characteristics and the advantages as the method briefly disclosed above. These advantages are therefore not restated here.

BRIEF DESCRIPTION OF THE DRAWINGS

The invention will be understood more clearly from a reading of the description which follows, made with regard to the accompanying drawings in which.

DETAILED DESCRIPTION

Figure 1:
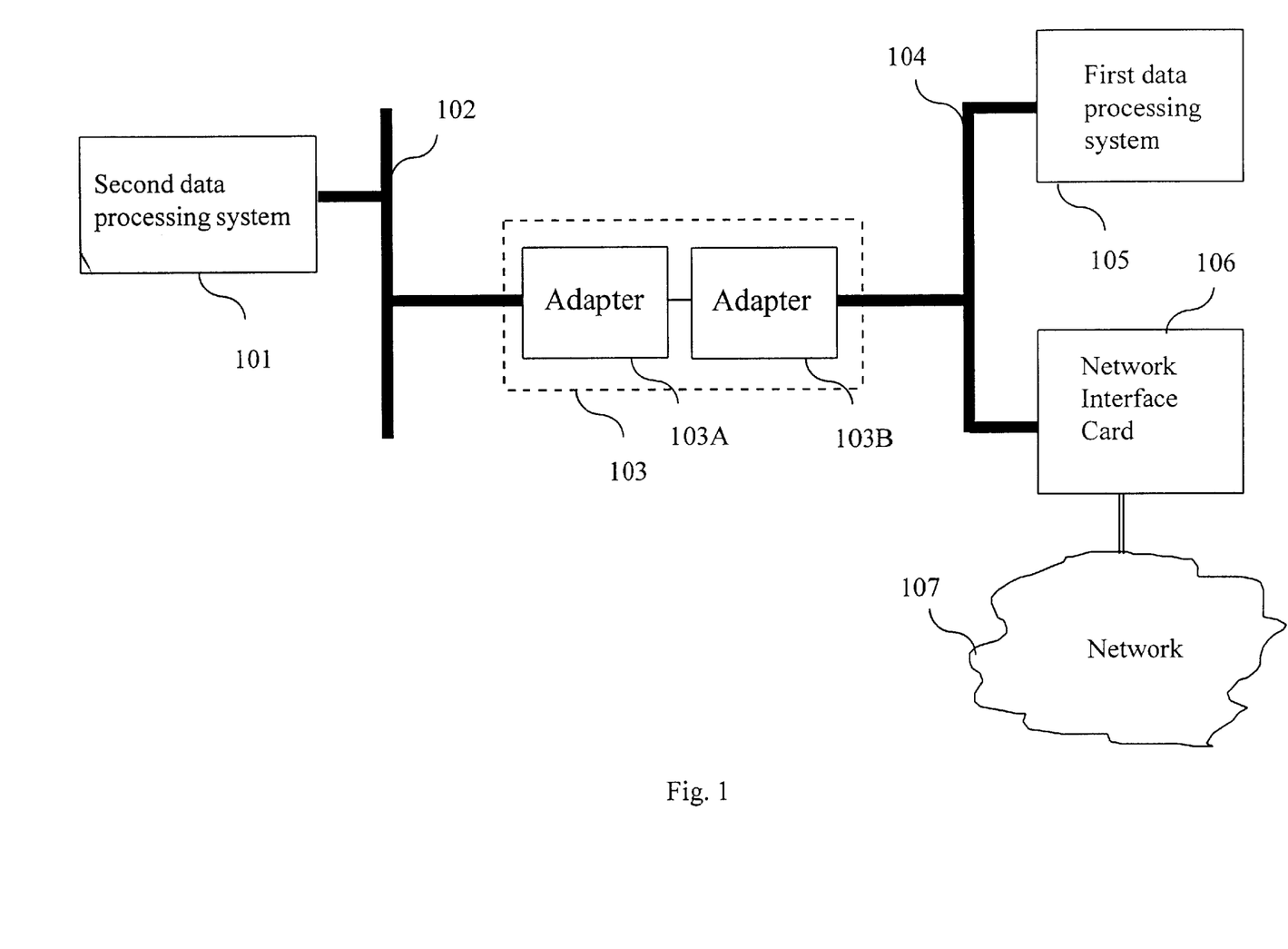
FIG. 1 depicts, highly schematically, a data processing apparatus architecture to which the present invention applies.

FIG. 1 depicts a second data processing apparatus 101, having a second data processing bus 102 itself connected, by means of an apparatus for communicating between buses 103, to a first data processing bus 104 of a first data processing apparatus 105.

The data processing apparatuses 101 and 105 are of a known type. They consist for example of:

computers known as "PCs" and having a processor of the "PENTIUM" type from the American manufacturer "INTEL"

a printer, a facsimile machine, a photographic apparatus, a camera, and more generally any apparatus able to communicate data by means of a network, in sending and/or receiving mode.

The data processing buses 102 and 104 are of a known type. They are for example defined by a bus standard known as "PCI" (initials of the English words Peripheral Component Interconnect (the reader can refer, in this regard, to the specifications of the PCI standard: "PCI Local Bus Specifications revision 2.1").

The system of communication between buses 103 is of a known type. It is for example cabled, or of the infrared transmission, radio transmission or optical transmission type. It is for example architectured around intermediate memories. This system is positioned between:

on the one hand the bus 102 by means of a part 103A having a PCI adapter and a local bus to which this PCI adapter is connected, and on the other hand the bus 104 by means of a part 103B having a PCI adapter and a local bus to which this PCI adapter is connected.

In the inter-bus communication system 103, to each of the local buses there are connected an input port and an output port of a dual-port memory or of two memories of the FIFO type each adapted to the transmission of data in a favoured direction.

Each PCI adapter thus constitutes an interface adapter between one of the PCI data processing buses and a local bus. Each of the buses 102 and 104 and thus access the intermediate memory in write or read mode, by means of an interface adapter.

There is also connected to the bus 104 a network interface card 106 of a known type, connected to a communication network 107, itself of a known type. This communication network enables the data processing apparatuses 101 and 105 to communicate with other data processing apparatuses situated at a distance.

In this hardware configuration, the invention aims to improve communication between each of the data processing apparatuses 101 and 105 on the one hand and the communication network 107 on the other hand.

Preferably, the clocks of the two data processing apparatuses are asynchronous, the interbus communication system 103 being responsible for the asynchronous transmission of the data between the two buses.

Figure 2:
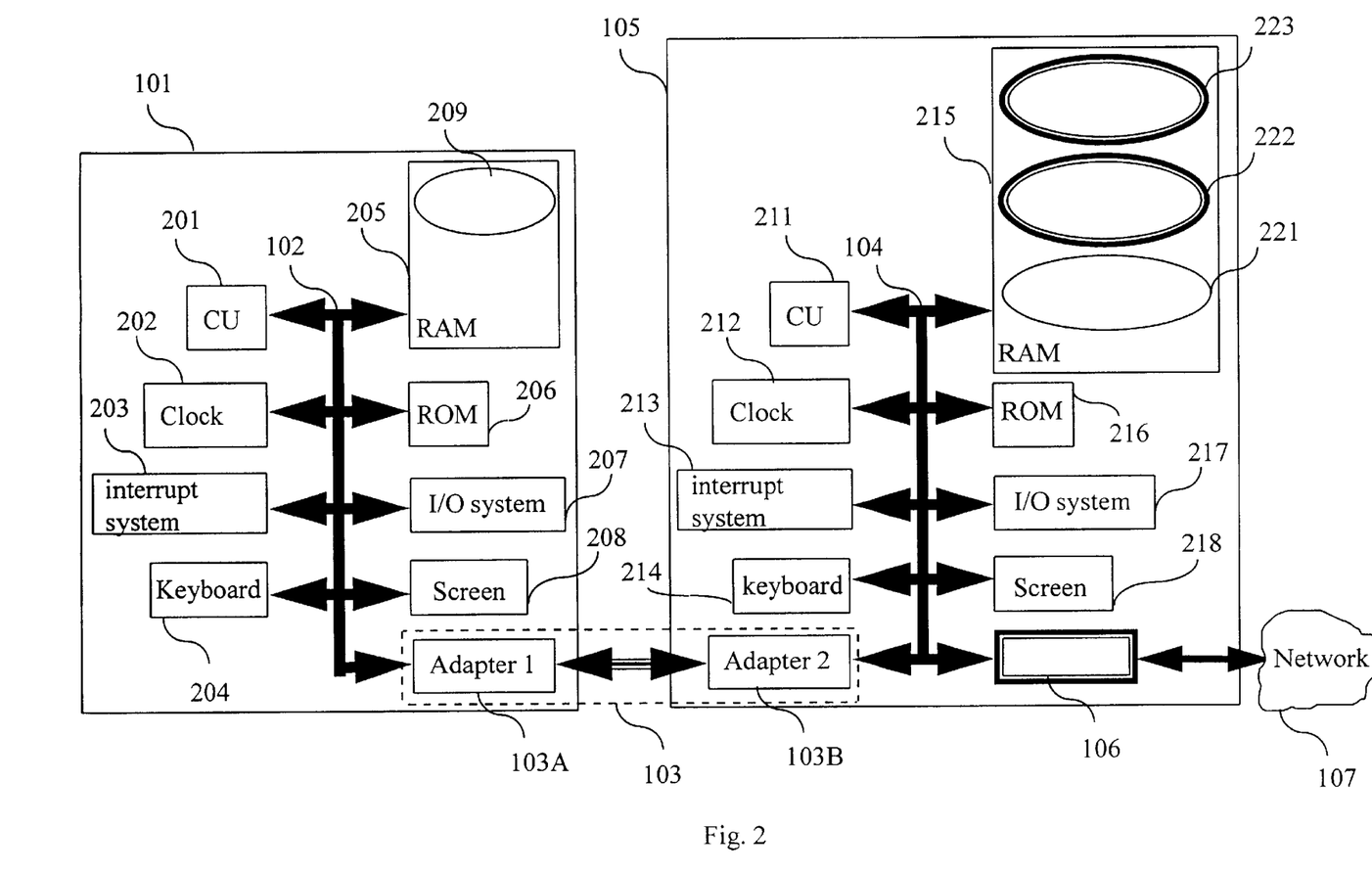
FIG. 2 depicts, highly schematically, the components connected to the buses illustrated in FIG. 1.

FIG. 2 depicts the second data processing apparatus 101, the second data processing bus 102, the interbus communication system 103, the first data processing bus 104, the first data processing apparatus 105, the network interface card 106 and the communication network 107.

The second data processing apparatus 101 has a central unit 201, clocks 202, an interrupt system 203, a keyboard 204, random access memory 205, read only memories 206, an input/output system 207, a display screen 208 and the part 103A of the interbus communication system 103.

All these components or groups of components are of a known type and use software of a known type, with the exception of a communication interface control module 209, incorporated in the random access memories 205. This communication module is illustrated in FIGS. 3 to 8.

The first data processing apparatus 105 has a central unit 211, clocks 212, an interrupt system 213, a keyboard 214, random access memories 215, read only memories 216, an input/output system 217, a display screen 218, the part of the interbus communication system 103 which is not in the second data processing apparatus 101, and a network interface card 106 connected to the communication network 107.

All these components or groups of components are of a known type and use software of a known type, with the exception of:

a communication interface control module 221, a control and signalling module 222, and a network interface card driver 223, these three software modules being incorporated, during operation, in the random access memory 215. Outside the period of operation, these software modules are stored in a non-volatile memory of a known type. These modules are illustrated in FIGS. 3 to 8. It will however already be observed here that the communication interface control modules 209 and 221 serve to organise communication between the two data processing apparatuses 101 and 105, whilst the control and signalling module 222 and the network interface card driver 223 serve to organise communication between the first data processing apparatus 105 on the one hand and the network 107 on the other hand.

The interbus communication system consisting of electronic cards 103A (connected to the bus 102) and 103B (connected to the bus 104) is said to be "transparent", that is to say it does not modify the structure or organisation of the data transmitted from one bus to the other.

Figure 3:
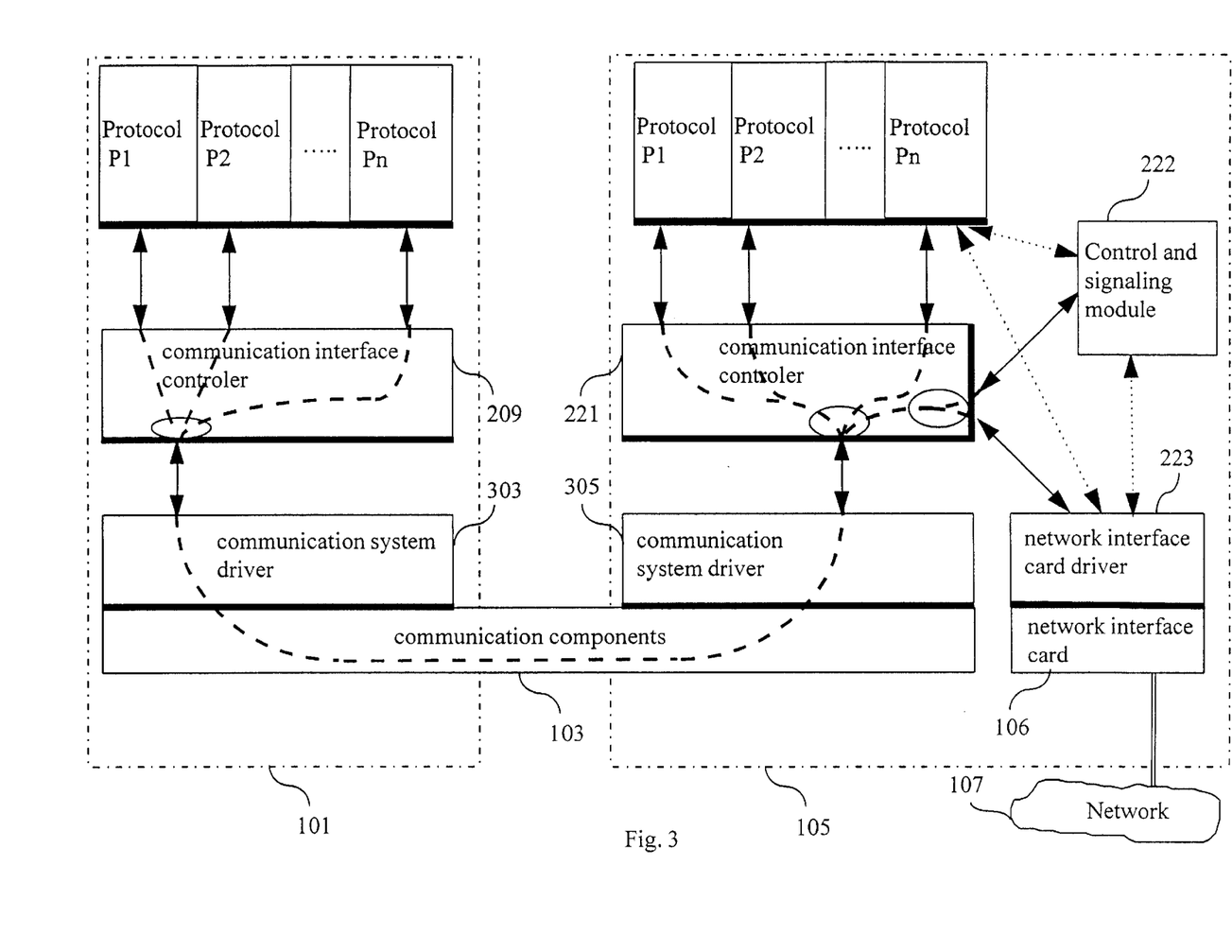
FIG. 3 depicts, highly schematically, a hardware and software architecture of a first embodiment of the apparatus according to the present invention.

FIG. 3 depicts, in the first embodiment of the present invention, the second data processing apparatus 101 and the first data processing apparatus 105 both connected by a communication system 103 (including the cards 103A and 103B).

Figure 5:
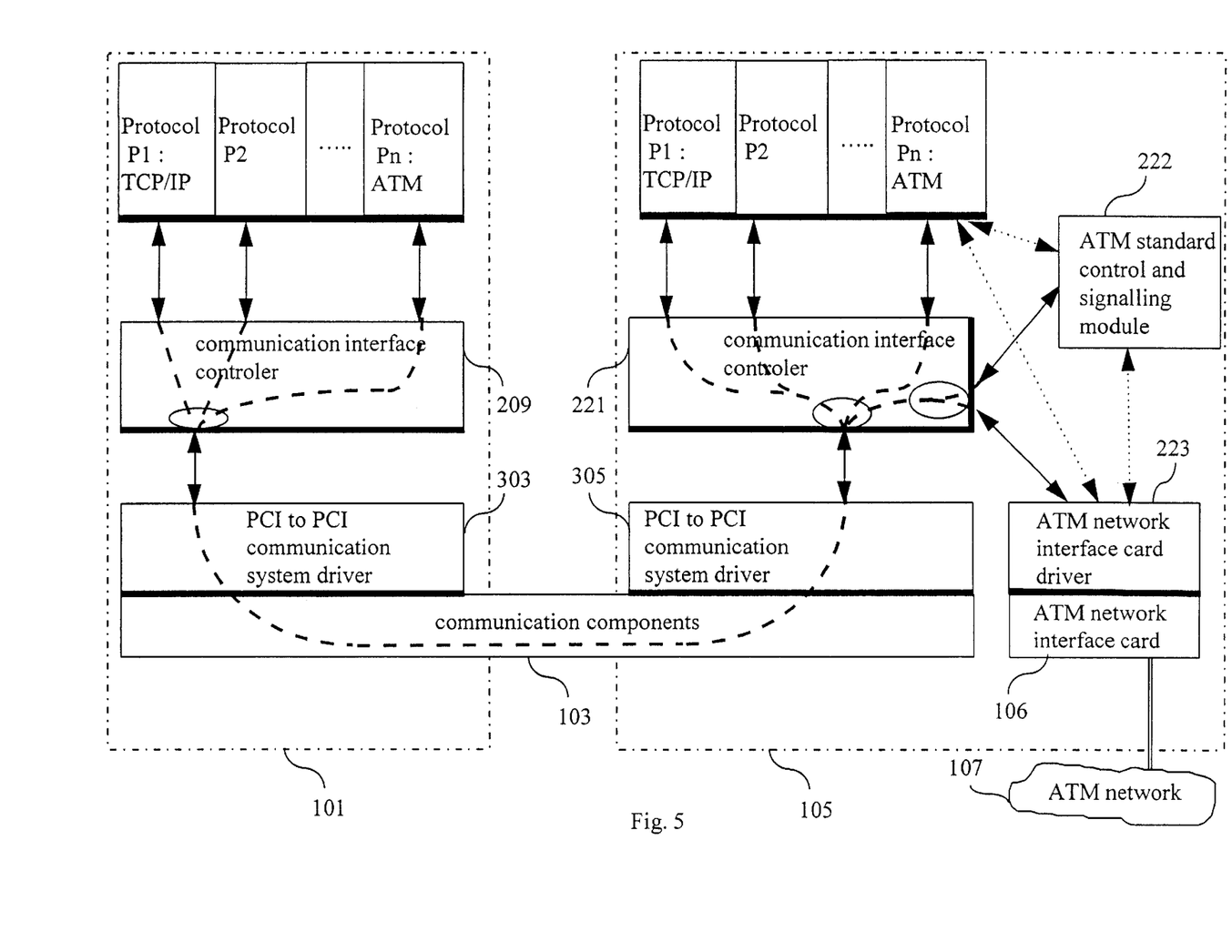
FIG. 5 depicts, highly schematically, a hardware and software architecture of a second embodiment of the apparatus according to the present invention.

In FIG. 3 (and, in the same way, in FIG. 5) the data processed locally in the first data processing apparatus 105 can follow different paths from those of the data coming from the second data processing apparatus 101. These paths are depicted in dotted arrowed lines. They symbolise the known type of operation of the apparatus according to the invention with regard to:

the processing of the data coming from the first data processing apparatus and intended to be transmitted over the network 107, and the processing of the data coming from the network 107 and intended to be transmitted to a protocol implemented by the first data processing apparatus 105.

The data exchanged between the communication interface controllers 209 and 221 are said to be "user" and are composed of two categories of data:

some of these data are termed "user" data, if they are intended for, or come from, the network interface card driver 223 (they are then intended to be transmitted at a distance), the others of these data are termed "signalling" data and are intended for, or come from, the control and signalling module 222 (they then serve to specify the transmission of the user data).

The second data processing apparatus 101 uses software applications using protocols P1, P2, . . . , Pn which are used for communicating between these applications and a communication interface control module 209. This communication takes place by exchange of packets of user data and signalling data. The communication interface control module 209 stores the information to be transmitted and communicates with a communication system driver 303 connected to the communication system 103, exchanging with it packets of user data (user and signalling) and packets of commands.

The communication interface control modules 209 and 221, the control and signalling module 222 and the network interface card driver 223 store notably routing and look-up tables for dissociating a path or a function with each packet. These tables thus enable these components to be adapted to the different applications and to the different protocols able to communicate.

By way of example, the protocol P1 is a protocol known as "TCP/IP" which means in English "Transmission Control Protocol/Internet Protocol" and in French "Protocol de controle de transmission/protocole Internet" and the protocol Pn is a protocol complying with the ATM standards (initials of the English words "Asynchronous Transfer Mode").

The TCP/IP protocol functions in accordance with what is described in the book "TCP/IP Illustrated, volume 1", The Protocol, W Richard Stevens, Addison-Wesley, and the ATM standard is enacted by the ATM forum known as: "ATM Forum Technical Committee, User-Network Interface, Specifications version 3.1".

The first data processing apparatus 105 uses software applications using protocols P1, P2, . . . , Pn, which serve for communication between these applications and a communication interface controller 221. This communication takes place by exchange of packets of user data and signalling data.

The communication interface controller 221 communicates:

with a communication system driver 305 connected to the communication system 103, exchanging with it packets of user data and command packets;

with a control and signalling module 222, exchanging with it packets of signalling data; and with a network interface card driver 223, exchanging with it packets of user data.

Finally, the network interface card driver 223 controls the operation of a network interface card 106.

The communication interface controllers 209 and 221 are specific to the present invention. They are principally intended to:

offer the possibility, to the two data processing apparatuses 101 and 105, of sharing the network access resource consisting of the network interface card driver 223 and network interface card 106, and, where applicable the software resource consisting of the control and signalling module 222, implement different phases of negotiation between:
the two communication interface controllers 209 and 221,
one of the communication interface controllers on the one hand and the network interface card driver 223 on the other hand, and
one of the communication interface controllers on the one hand and the control and signalling module 222 on the other hand, implement a multi-protocol multiplex communication (that is to say several communications can be managed simultaneously), enable communication between data processing apparatuses, from one end to the other of the network 107.

The communication interface controllers 209 and 221 are identical, independent of the low-level communication layers which are used, and have the same high and low interfaces.

The communication system drivers 303 and 305 and the communication system 103 transmit as a whole, without adding, without removing and without modification, the data packets and command packets which they receive.

Figure 4:
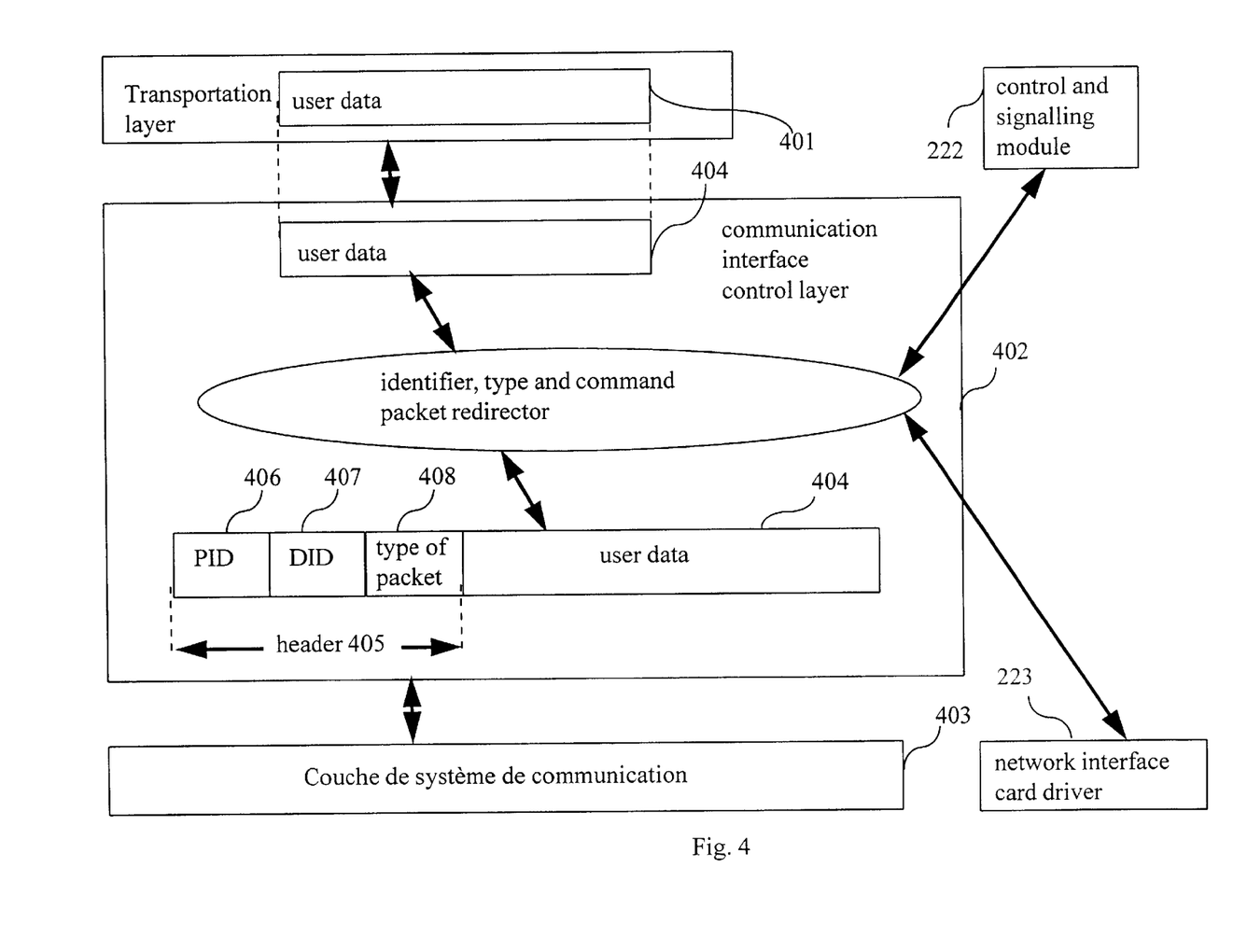
FIG. 4 depicts the protocol layers implemented in the first embodiment illustrated in FIG. 3 and the structure of an information sequence transmitted by a data processing apparatus illustrated in FIGS. 1 to 3.

In FIG. 4, three protocol layers can be seen:

the transportation layer 401, which corresponds in fact to the protocols $P_1$ to $P_n$ illustrated in FIG. 3, the multi-protocol communication interface controller layer 402, which corresponds to the communication interface control modules 209 and 221, and the communication system layer 403, which corresponds to the communication system driver 303, by means of the communication system 103 (FIG. 3), including the cards 103A and 103B.

A sequence of user data 404, coming from the transportation layer 401, is associated, in the multi-protocol communication system layer 402, with a set of additional information 405 make it possible subsequently to redirect the user information. This set of additional information 405 is also referred to, in the remainder of the description, as a "header" since it is preferentially transmitted in the same data frame but before the user data.

It will be observed here that, in the same way, internal data, which are proper to the communication interface control layer 402 and are used for the layer to layer management between the two data processing apparatuses, are associated with in the same type of header 405.

The set of additional information 405 includes:

protocol identification information PID 406, in the form of four binary data, communication means identification information DID 407, in the form of three binary data, and information of the user information type, PCK TYPE 408, in the form of one binary data item whose value indicates whether the user information packet 401 includes solely user data or whether it includes solely signalling data.

For example, the value of the protocol identification information PID 406 is "0" when it is a case of command information. Otherwise this value is the number of the protocol implemented (see operation 808 with regard to FIG. 8).

Where a packet of user data is received from the communication system layer 403, according to the value of the binary data item PCK TYPE 408, the user data 404 are transmitted either to a control and signalling module 222 (when the binary data item corresponds to signalling data) or to the driver 223 of the network interface card 106.

It will be understood that the header 405 enables the communication interface controllers 209 and 221 to recognise immediately the type, the destination and the protocol used for communicating a packet.

According to the embodiment in FIG. 4, the invention adds a layer which analyses everything which is transmitted.

In the second embodiment of the present invention, illustrated in FIG. 5, the same elements are found again as in FIG. 3, in the case where:

the second data processing apparatus 101 is a host computer of the PC type, functioning with the WINDOWS NT (registered trade mark) operating system sold by the American company MICROSOFT (registered trade mark), and having a bus complying with the PCI standard;

the first data processing apparatus 105 is a motherboard provided with a PENTIUM (registered trade mark) processor manufactured by the American company INTEL (registered trade mark) and functioning with the CHORUS (registered trade mark) operating system sold by the American company CHORUS, now a subsidiary of the company SUN Microsystems Inc (SUN is a registered trade mark), and having a bus complying with the PCI standard, with this first data processing apparatus 105 is plugged into a bus connector of the second data processing apparatus 101;

the communication system drivers 303 and 305 are PCI to PCI communication system drivers;

the control and signalling module 222 is a control and signalling module complying with the ATM standard;

the network interface card driver 223 is a driver complying with the ATM standard; and the network interface card 106 is a card complying with the ATM standard.

Thus, in the apparatus illustrated in FIG. 5, the hardware architectures of the data processing apparatuses are different and the operating systems are also different.

Figure 6:
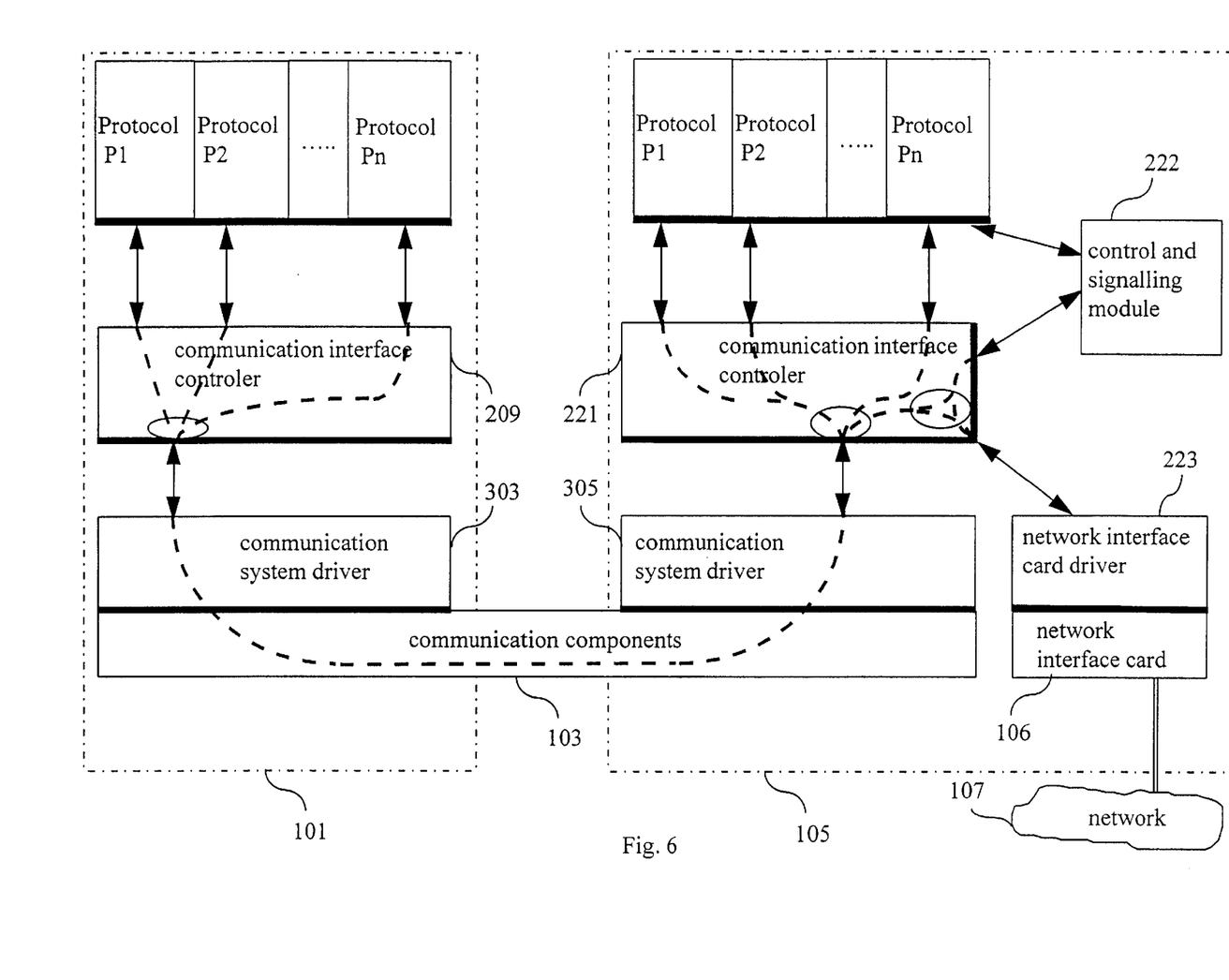
FIG. 6 depicts, highly schematically, a hardware and software architecture of a third embodiment of the apparatus according to the present invention.

In FIG. 6, there can be seen, in a third embodiment of the present invention, the same elements as in FIG. 3, except, even where the network resource is used locally:

in sending mode,
all the user information is transmitted by means of the communication interface controller 221, whereas
all the signalling information is directly transmitted to the control and signalling module 222, and
in receiving mode, all user information is transmitted by means of the communication interface controller 221.

Figure 7:
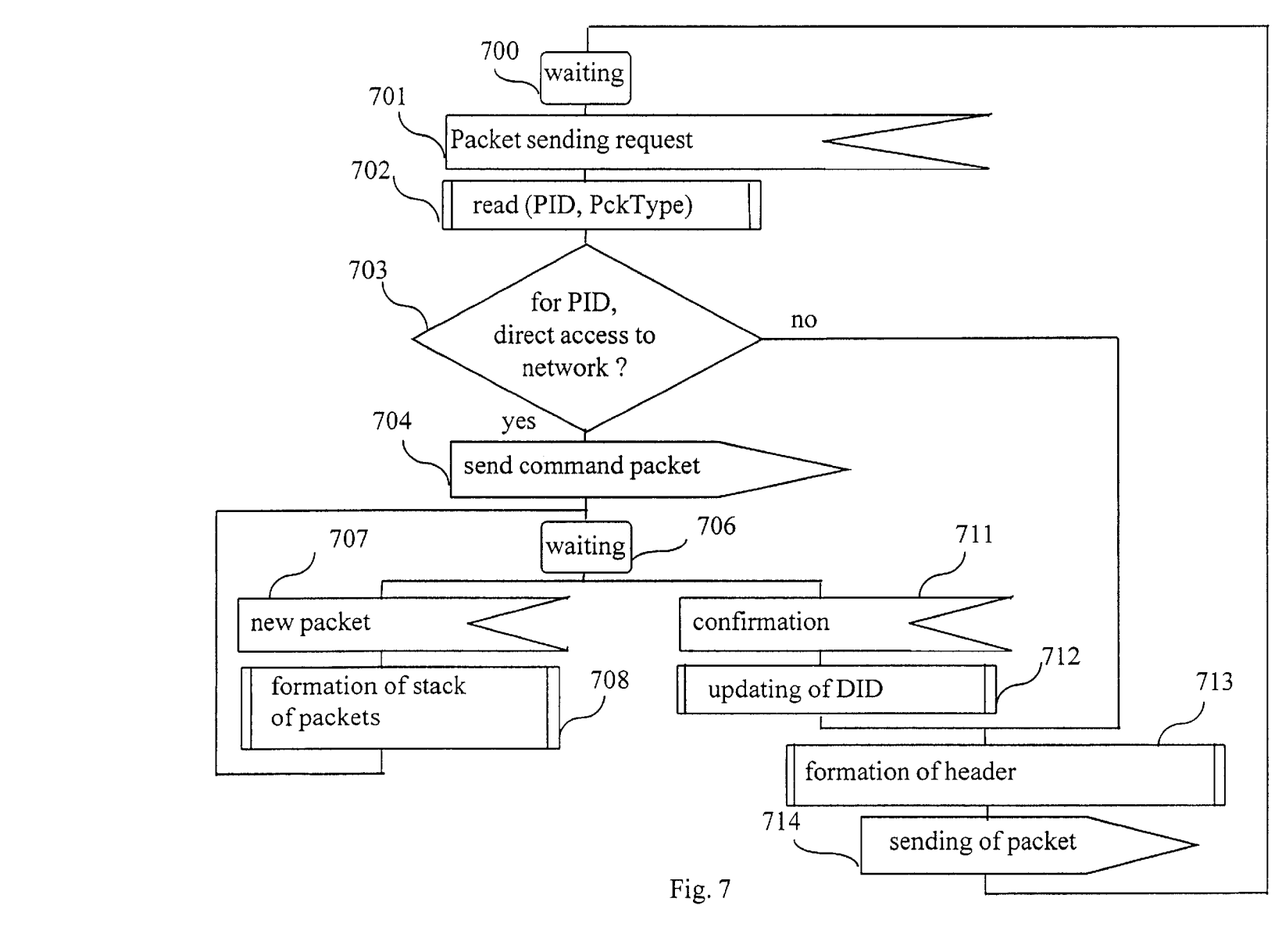
FIG. 7 depicts a sending flow diagram according to the method of the present invention.

FIG. 7 depicts successive operations implemented by the communication interface controller 209, for sending a packet of user data intended for the first data processing apparatus 105. The same operations are performed by the communication interface controller 221 when the first data processing apparatus 105 sends user data intended for the second data processing apparatus 101.

As a preliminary, in a first initialisation phase, not shown, in each of the data processing apparatuses 101 and 105, the communication interface controller performs a series of initialisation operations. These notably make it possible to find out the local network resources of each data processing apparatus, and then to communicate them between communication interface controllers of each data processing apparatus.

During these initialisation operations, each communication interface controller updates a set of data used internally, notably making it possible to establish the matches between protocols, identifiers and types of network resources present locally or on another data processing apparatus, according to known techniques.

Initially, the communication interface controller 209 is in the wait state 700, that is to say it is available for performing operations.

During an operation 701, the communication interface controller 209 receives, from an application used by the data processing apparatus 101, a message requesting sending of data packets.

During an operation 702, the communication interface controller 209 reads, in the message requesting the sending of a packet under consideration, the following information:

the protocol identifier PID 406 and, where applicable, the packet type binary information PCK TYPE 408.

During an operation 703, the communication interface controller 209 determines whether, for the protocol in question, it is necessary to use direct access to the "remote" resources, according to the value of the protocol identifier PID and, in the affirmative, according to the protocol under consideration, whether or not the establishment of a new connection is required.

Then the result of one of the tests performed during the operation 703 is negative, the communication interface controller 209 performs an association operation 713 (see below).

When the result of the test 703 is positive, during an operation 704, the communication interface controller 209 sends, to the communication interface controller 221, a command packet containing information internal to the controller in order to determine the additional information, such as for example the communication means identification information DID 407.

During an operation 706, the communication interface controller 209 waits until one of the events illustrated in cases 707 and 711 occurs.

If, during this period, the communication interface controller 209 receives first of all another data packet message, from the other data processing apparatus, operation 707, during an operation 708, it puts this packet in a stack of packets intended for future processing, and then it returns to the operation 706.

If, during the waiting period of the operation 706, it receives confirmation of the command packet from the communication interface controller 221, operation 711, it updates its internal data such as notably the communication means identifier DID 407, during an operation 712. Then, during an association operation 713, the communication interface controller 209 forms the header 405 and associates it with the set of user information and, during an operation 714, it sends the packet, provided with the header 405, to the communication interface controller 221. Next, the communication interface controller 209 returns to the wait state 700.

Figure 8:
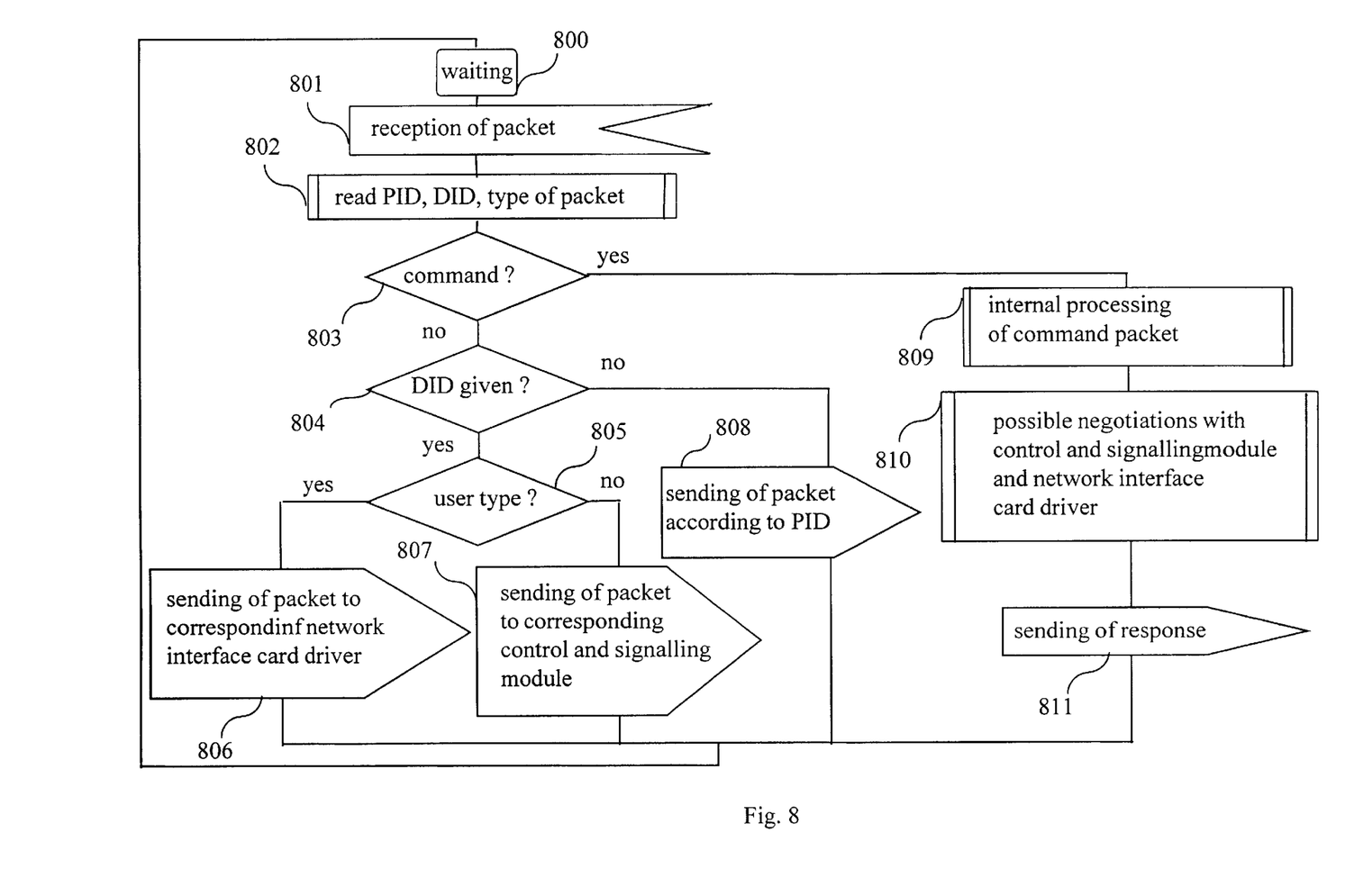
FIG. 8 depicts a receiving flow diagram according to the method of the present invention.

FIG. 8 depicts the successive operations implemented by the communication interface controller 209, for receiving a packet of user data coming from the first data processing apparatus 105. The same operations are implemented by the communication interface controller 221 when the first data processing apparatus 105 receives user data coming from the second data processing apparatus 101.

Initially, the communication interface controller 209 is in the wait state 800.

During an operation 801, the communication interface controller 209 receives, from the communication interface controller 221, a data packet including user data 404 and a header 405.

During an operation 802, the communication interface controller 209 reads, in the additional information 405, the protocol identifier PID 406, the communication means identifier 407 and the packet type binary information PCK TYPE 408.

During a test 803, the communication interface controller 209 determines whether or not the packet concerns commands. It should be stated here that, in the example described and depicted, the value of the protocol identification information PID 406 is "0" when it is a case of command information. Otherwise this value is the number of the protocol implemented.

Thus, when the value of the protocol identification information PID 406 is equal to "0", the command packets are intended to be processed locally, by the communication interface controller 209, with a view to organising its functioning, without being transmitted over the network.

When the result of the test 803 is positive and in the case of the second embodiment (FIG. 5), the communication interface controller 209 or 221 performs an operation 809 which consists of internally processing the command packet, and then, solely in the case of the communication interface controller 221, which has a network resource, an operation 810, during which the communication interface controller 221 goes into an information exchange phase (a so-called "negotiation" phase) with:

the control and signalling module 222, and/or the network interface card driver 223, that is to say it sends to them a packet of the signalling type and/or internal information to be communicated (stored since the initialisation or renewed) and to be used after storage in the controller 221, at the time of the direct accesses to the network interface card driver 223.

Next, during an operation 811, the communication interface controller 209 sends a reply to the communication interface controller 221. Finally, the controller 209 returns to the wait state 800.

When the result of the test 803 is negative, during a test 804, the communication interface controller 209 determines whether or not the communication means identifier DID 407 is significant (if not, only the additional protocol identification information is significant).

When the result of the test 804 is negative, during an operation 808, the communication interface controller 209 dissociates the header 405 and the user information 404, and sends, to the protocol concerned, a packet whose content depends on the value of the protocol identifier PID 406. Next, the communication interface controller 209 returns to the wait state 800.

When the result of the test 804 is positive, during a test 805, the communication interface controller 209 determines whether or not the type of data contained in the packet concerns user data.

When the result of the test 805 is positive, during an operation 806, the communication interface controller 209 associates the header 405 and the user information 404, and sends, to the network interface card driver 223 corresponding to the communication means identifier DID 407, the packet of user data 404.

Next, the communication interface controller 209 returns to the wait state 800.

When the result of the test 805 is negative, during an operation 807, the communication interface controller 209 dissociates the header 405 and the user information 404 and sends, to the control and signalling module 222 corresponding to the communication means identifier DID 407, the packet of signalling data 404.

Next, the communication interface controller 209 returns to the wait state 800.

By virtue of the implementation of the invention, the network communication resource 107 is shared between the two data processing apparatuses, the packets of different types are routed in different ways, different types of protocol can be used for communicating over the network 107, and the transfer of data is optimised (the number of copies of the data to be transmitted is minimised).

From a reading of the above, it will be understood that, in accordance with the present invention, for communication between two data processing apparatuses each having a microprocessor and memory, the data processing apparatus 105 having and managing at least one input/output resource 106, for communicating each set of user information 404 coming from the data processing apparatus 101 and intended to be transmitted to a said input/output resource managed by the first data processing apparatus:

there is performed by the data processing apparatus 101 an operation of dissociating, with the said set of user information, a set 405 of additional information representing:

the communication layer from which the information comes in the data processing apparatus 101, by means of the additional protocol identification information PID 406, and the said input/output resource, by means of additional information 407 identifying a communication means DID; and there is performed conjointly by the two data processing apparatuses an operation of transmitting the said sets of information from the data processing apparatus 101 to the data processing apparatus 105.

Correlatively, it will be understood that, in accordance with the present invention, for communicating each set of user information 404 coming from the card 106 managing the input/output resources and intended to be transmitted to the data processing apparatus 101:

there is performed by the data processing apparatus 105 an operation of dissociating, with the said set of user information, a set 405 of additional information representing:

the communication layer for which the information is intended, by means of the additional information 406 identifying a protocol PID, and the said input/output resource, by means of the additional information 407 identifying a communication means DID; and there is performed conjointly by the two data processing apparatuses an operation of transmitting the said sets of information from the data processing apparatus 105 to the data processing apparatus 101.

According to a first variant, the set of additional information includes an item of information identifying the source data processing apparatus, which is used in particular when there are more than two data processing apparatuses which can use the input/output resource.

According to a second variant, the set of additional information includes an item of information identifying the data processing apparatus for which the transmitted information is intended.

According to a third variant, the set of additional information includes an item of information identifying the user information packet number.

According to a fourth variant, each data processing apparatus has at least one input/output resource and each data processing apparatus communicates in accordance with the method of the present invention, by mean of input/output resources which it does not manage directly.

The scope of the invention is not limited to the embodiments described and depicted by on the contrary extends to any modifications and improvements within the capability of a person skilled in the art.

What is claimed is:

1. A communication method in a second data processing apparatus, said method comprising:
    a driver share step of sharing a network interface driver of an input/output resource managed by a first data processing apparatus;
    performed by the second data processing apparatus, an association step of associating, with primary information intended for being transmitted to the network interface driver, additional information representing:
        a communication protocol from where the primary information comes in the second data processing apparatus, and
        the input/output resource; and
    performed conjointly by the first and second data processing apparatuses, a transmission step of transmitting the primary information and the additional information from the second data processing apparatus to the first data processing apparatus, said primary information being transmitted to the network interface driver, which accesses to a network.

2. A communication method according to claim 1, wherein, after said transmission step of transmitting the primary information and the additional information, the first data processing apparatus performs a dissociation step of dissociating the additional information and the primary information.

3. A communication method according to claim 1, wherein, during said transmission step of transmitting the primary information:
    the second data processing apparatus performs a storage step of storing information in an intermediate storage unit, and
    the first data processing apparatus performs a read step of reading the information from the intermediate storage unit.

4. A communication method in a first data processing apparatus, said method comprising:
    an execution step of executing a network interface driver of an input/output resource managed by the first data processing apparatus;
    performed by the first data processing apparatus, an association step of associating, with primary information from the network interface driver, additional information representing:
        a communication protocol for which the primary information is intended in the first data processing apparatus, and
        the input/output resource; and
    performed conjointly by the first and second data processing apparatuses, a transmission step of transmitting the primary information and the additional information from the first data processing apparatus to a second data processing apparatus, said primary information being transmitted from the network interface driver, which accesses to a network.

5. A communication method according to claim 4, wherein, after said transmission step of transmitting the primary information and the additional information, the second data processing apparatus performs a dissociation step of dissociating the additional information and the primary information.

6. A communication method according to claim 4, wherein, during said transmission step of transmitting the primary information and the additional information:
    the first data processing apparatus performs a storage step of storing information in an intermediate storage unit, and
    the second data processing apparatus performs a read step of reading from the intermediate storage unit.

7. A communication method according to claim 4, wherein, during said association step, the additional information represents a type of the primary information, the type corresponding to signaling and/or control information, intended to be interpreted for using the input/output resource, or to information to be transmitted at a distance.

8. A communication method according to claim 4, wherein, during said association step, the additional information represents a data processing apparatus from which the primary information comes.

9. A communication method according to claim 4, wherein, during said association step, the additional information represents a data processing apparatus for which the primary information is intended.

10. A second data processing apparatus comprising:
    driver share means for sharing a network interface driver of an input/output resource managed by a first data processing apparatus;
    association means for associating, with primary information intended for being transmitted to the network interface driver, additional information representing:
        a communication protocol from where the primary information comes in said second data processing apparatus, and
        the input/output resource; and
    transmission means for transmitting the primary information and the additional information from said second data processing apparatus to the first data processing apparatus, said primary information being transmitted to the network interface driver in order to communicate with another data processing apparatus via a network.

11. A second data processing apparatus according to claim 10, wherein the first data processing apparatus includes dissociation means for dissociating the additional information and the primary information.

12. A second data processing apparatus according to claim 10, wherein each data processing apparatus includes an asynchronous clock.

13. A second data processing apparatus according to claim 10, further comprising storage means adapted to store the primary information and the additional information in an intermediate memory,
    wherein said transmission means includes the intermediate memory, and
    wherein the first data processing apparatus includes reading means adapted to read the primary information and the additional information stored in the intermediate memory.

14. A first data processing apparatus comprising:
execution means for executing a network interface driver of an input/output resource managed by said first data processing apparatus;
association means for associating, with primary information from the network interface driver, additional information representing:
a communication protocol for which the primary information in said first data processing apparatus is intended, and
the input/output resource; and
transmission means for transmitting the primary information and the additional information from said first data processing apparatus to a second data processing apparatus, said primary information being transmitted from the network interface driver, which accesses a network.

15. A first data processing apparatus according to claim 14, wherein the second data processing apparatus includes dissociation means for dissociating the additional information and the primary information.

16. A first data processing apparatus according to claim 14, wherein each data processing apparatus includes an asynchronous clock.

17. A second data processing apparatus according to claim 10, wherein the first and said second data processing apparatuses apply different hardware architectures.

18. A second data processing apparatus according to claim 10, wherein the first and said second data processing apparatuses use different operating systems.

19. A second data processing apparatus according to claim 10,
wherein said transmission means includes an intermediate memory,
wherein the first data processing apparatus includes storage means adapted to store the primary information and the additional information in the intermediate memory, and
wherein said second data processing apparatus further comprises reading means adapted to read the primary information and the additional information stored in the intermediate memory.

20. A second data processing apparatus according to claim 10, wherein said association means is adapted so that the additional information represents a type of the primary information, the type corresponding to signaling and/or control information, intended to be interpreted for using the input/output resource, or to information to be transmitted at a distance.

21. A second data processing apparatus according to claim 10, wherein said association means is adapted so that the said additional information represents a data processing apparatus from which the primary information comes.

22. A second data processing apparatus according to claim 10, wherein said association means is adapted so that the additional information represents a data processing apparatus for which the primary information is intended.

23. A second data processing apparatus according to claim 10, wherein said second data processing apparatus is included in at least one of a computer, a printer, a scanner, a facsimile apparatus, a photocopier, a camera, and a photographic apparatus.

24. A first data processing apparatus according to claim 14, wherein said first data processing apparatus is included in at least one of a computer, a printer a scanner, a facsimile apparatus, a photocopier, a camera, and a photographic apparatus.

25. A network comprising a transmission channel and at least two data processing apparatuses, one of which is a second data processing apparatus according to claim 10, wherein the input/output resource is connected to said transmission channel.

26. A storage medium storing instructions for causing a microprocessor of a second data processing apparatus to perform the steps of:
sharing a network interface driver of an input/output resource managed by a first data processing apparatus;
associating, with primary information intended for being transmitted to the network interface driver, additional information representing:
a communication protocol from where the primary information comes in the second data processing apparatus, and
the input/output resource; and
transmitting the primary information and the additional information from the second data processing apparatus to the first data processing apparatus, said primary information being transmitted to the network interface driver, which accesses a network.

27. A storage medium storing instructions for causing a microprocessor of a first data processing apparatus to perform the steps of:
executing a network interface driver of an input/output resource managed by the first data processing apparatus;
associating, with primary information from the network interface driver, additional information representing:
a communication protocol for which the primary information is intended in the first data processing apparatus, and
the input/output resource; and
transmitting the primary information and the additional information from the first data processing apparatus to a second data processing apparatus, said primary information being transmitted from the network interface driver, which accesses a network.

* * * * *

UNITED STATES PATENT AND TRADEMARK OFFICE
CERTIFICATE OF CORRECTION

PATENT NO.    : 6,502,144 B1
DATED         : December 31, 2002
INVENTOR(S)   : Jean-Paul Accarie It is certified that error appears in the above-identified patent and that said Letters Patent is hereby corrected as shown below:

Title page,
Item [56], References Cited, U.S. PATENT DOCUMENTS, insert
-- 5,680,303 A  10/1997  Libucha et al.  364/138 --;
Item [57], ABSTRACT,
Line 2, "apparatuss" should read -- apparatuses --;

Drawings,
Sheet 4, Fig. 4, "Couche de système de communication" should read -- Communication system layer --;
Sheet 8, Fig. 8, "correspondinf" should read -- corresponding --;
Sheet 8, Fig. 8, "signallingmodule" should read -- signalling module --; and Column 16,
Line 10, "printer" should read -- printer, --.

Signed and Sealed this

Eighteenth Day of November, 2003

JAMES E. ROGAN
*Director of the United States Patent and Trademark Office*